United States Patent
Berrocal et al.

(10) Patent No.: US 10,721,941 B2
(45) Date of Patent: Jul. 28, 2020

(54) CREAMER FREE FROM ADDED EMULSIFIER(S), BUFFER(S) AND STABILIZING SALTS

(71) Applicant: NESTEC S.A., Vevey (CH)

(72) Inventors: Rafael Berrocal, Saint-Legier (CH); Maria Magdalena Dotzauer, Bern (CH); Jurg Schlaginhaufen, Stettlen (CH); Christophe Joseph Etienne Schmitt, Servion (CH); Lucile Waksman, Bern (CH); Alexandra Weingand-Ziade, Divonne-les-Bains (FR); Peter Zeltner, Worblaufen (CH)

(73) Assignee: Societe des Produits Nestle S.A., Vevey (CH)

( * ) Notice: Subject to any disclaimer, the term of this patent is extended or adjusted under 35 U.S.C. 154(b) by 143 days.

(21) Appl. No.: 15/327,081

(22) PCT Filed: Jul. 3, 2015

(86) PCT No.: PCT/EP2015/065198
§ 371 (c)(1),
(2) Date: Jan. 18, 2017

(87) PCT Pub. No.: WO2016/008742
PCT Pub. Date: Jan. 21, 2016

(65) Prior Publication Data
US 2017/0150731 A1     Jun. 1, 2017

(30) Foreign Application Priority Data

Jul. 18, 2014  (EP) .................................. 14177641

(51) Int. Cl.
| | | |
|---|---|---|
| A23C 11/04 | (2006.01) | |
| A23F 5/40 | (2006.01) | |
| A23C 13/14 | (2006.01) | |
| A23C 13/12 | (2006.01) | |
| A23L 9/20 | (2016.01) | |
| A23C 1/04 | (2006.01) | |
| A23C 11/00 | (2006.01) | |
| A23F 3/40 | (2006.01) | |
| A23F 5/46 | (2006.01) | |

(52) U.S. Cl.
CPC ................ *A23C 11/04* (2013.01); *A23C 1/04* (2013.01); *A23C 11/00* (2013.01); *A23C 13/125* (2013.01); *A23C 13/14* (2013.01); *A23F 3/405* (2013.01); *A23F 5/40* (2013.01); *A23F 5/465* (2013.01); *A23L 9/20* (2016.08); *A23V 2002/00* (2013.01)

(58) Field of Classification Search
CPC ........... A23C 11/04; A23C 1/04; A23C 11/00; A23C 13/125; A23C 13/14; A23L 9/20; A23F 3/405; A23F 5/40; A23F 5/465; A23V 2002/00
USPC ................................ 426/471, 580, 586, 588
See application file for complete search history.

(56) References Cited

U.S. PATENT DOCUMENTS

| | | |
|---|---|---|
| 4,689,245 A | 8/1987 | Kosikowski et al. |
| 5,928,703 A | 7/1999 | Chmiel et al. |

FOREIGN PATENT DOCUMENTS

| | | |
|---|---|---|
| EP | 2474234 A1 | 7/2012 |
| JP | H1153233 A | 2/1999 |
| WO | 2012146777 | 11/2012 |
| WO | 2013006045 | 1/2013 |

OTHER PUBLICATIONS

Mintel GNPD "Fresh Milk Creamer" printed from the Internet at http://www.gnpd.com, 3 pages, XP002738035.
Kelly, et al. "Coffee-Stability of Dried Creamers" Dairy Products Research Centre, End of Project Report, 1998, No. 14, 17 Pages.
Japan Patent Office Communication for Application No. P2017-501659, Dispatch No. 109492, Dispatch Date Mar. 17, 2020, 5 pages.
EP Patent Office Communication for Application No. 15734149.6-1106, dated Mar. 26, 2020, 17 pages.

*Primary Examiner* — Leslie A Wong
(74) *Attorney, Agent, or Firm* — K&L Gates LLP

(57) ABSTRACT

Creamers for whitening food products are provided. The creamers can havelong-term stability, high whitening capacity and a pleasant mouthfeel. In a general embodiment, the present disclosure provides aspray-dried creamer composition comprising added sugar comprising sucrose and/or lactose ranging from 5-30% by weight; milk ranging from 30-60% by weight; fat ranging from 15-40% by weight; wherein said composition is devoid of added emulsifiers and/or buffer-and stabilizing salts. The invention also provides a coffee creamer mix comprising the above creamer composition and coated or compacted coffee, wherein coffee dissolves after the creamer dissolution.

7 Claims, 2 Drawing Sheets

CREAMER FREE FROM ADDED EMULSIFIER(S), BUFFER(S) AND STABILIZING SALTS

CROSS REFERENCE TO RELATED APPLICATIONS

The present application is a National Stage of International Application No. PCT/EP2015/065198, filed on Jul. 3, 2015, which claims priority to European Patent Application No. 14177641.9, filed Jul. 18, 2014, the entire contents of which are being incorporated herein by reference.

BACKGROUND

The present disclosure generally relates to food products. More specifically, the present disclosure relates to creamers for food products such as coffee and tea.

Creamers are widely used as whitening agents with hot and cold beverages, e.g., coffee, cocoa, tea, etc. They are commonly used in place of milk and/or dairy cream. Creamers may come in a variety of different flavors and provide a whitening effect, mouthfeel, body, and a smoother texture.

Creamers can be in liquid or powder forms. One disadvantage of powder forms is that they do not generally provide an impression of traditional dairy creamers. Another disadvantage of using powder creamers may include difficulties in dissolution when added to coffee, and also the possibility of having a non-homogeneous beverage.

More and more consumers are concerned by the naturalness of food products. Regular coffee creamers contain additives to prevent a product defect called "flocculation"; occurring upon reconstitution of creamer-coffee-mixes in hot water; respectively upon reconstitution of the creamer alone in hot coffee. Flocculation describes the process of milk protein destabilization (feathering, precipitation) which can be induced by two main mechanisms: (i) Acidity induced flocculation and (2) Heat and hard water induced flocculation. Heating of milk proteins leads to a change of the natural state of whey proteins. If the temperature is >70° C., the denaturation is irreversible; and denatured whey proteins interact to form large aggregates, visible as "feathering"/"flocculation" and sedimentation in the final beverage. Whey proteins are also sensitive to free $Mg^{2+}$ and $Ca^{2+}$ in water. High concentrations of these free ions ("hard water") can lead to a similar denaturation process as described above as they are promoting aggregation by reducing repulsive charge at the surface of proteins. Regular coffee creamer contains also very often emulsifier added to prevent a destabilization of the emulsion. These additives are so called emulsifiers, buffer, and stabilizing salts, are mostly labelled as INS- or E-number on the ingredients list, which has a negative impact on the consumer perception and acceptance of those products (chemical/artificial connotation).

Thus, there is a demand for commercially available more natural creamers (free from additives). However as mentioned above, usually non-dairy powdered coffee creamers contain stabilizers such as synthetic emulsifiers, buffer and stabilizing salts and may also contain whitening agents that are all not perceived as natural by the consumer. These artificially perceived food ingredients, however, are typically needed to guarantee the physical stability of the coffee creamer over the shelf life of the product and after pouring into coffee in order to achieve their desired whitening effect in the coffee. In the absence of these ingredients, the coffee creamers are much less stable over time and show less whitening and adverse sensorial effects. Currently, "pseudo natural creamers" exist, which are dairy or non-dairy based but still contain either emulsifiers or buffer salts, chelators such as dipotassium phosphate, sodium citrate and sometime artificial and natural flavor combinations. Although these pseudo natural creamers are touted as being natural, they usually still contain additives.

Half and half (half liquid cream—half liquid milk) can be considered as a natural dairy creamer but it does not sweeten or flavor the coffee and it is only available in liquid form. Therefore, there is a need for naturally perceived powdered creamers having long-term stability along with excellent whitening and sensorial properties without E-numbers.

SUMMARY

The present disclosure relates to creamers for food products and methods of making the creamers in powder form. The creamers can be stored at room temperature or chilled and be stable for extended periods of time. The creamers can have high whitening capacity and a pleasant mouthfeel while masking the bitterness and astringency of a beverage.

Embodiments of the present disclosure provide spray-dried powder creamers that do not need to contain any stabilizers, synthetic emulsifiers, buffer salts or artificial whitening agents, but which can be stable for 6 months or longer at room temperature and provide a good whitening effect in beverages, for example, such as coffee.

The present invention relates to a spray-dried creamer composition comprising added sugar comprising sucrose and/or lactose ranging from 5-30% by weight; milk ranging from 30-60% by weight; fat ranging from 15-40% by weight; wherein said composition is devoid of added agents, wherein said composition does not flocculate upon reconstitution in water at temperature of water ranging from 40-90° C. and hardness up to 400 ppm $CaCO_3$, preferably from 250 to 400 ppm $CaCO_3$. The added agents not included in the composition of the present invention and is avoided comprises emulsifiers, buffer and stabilizing salts. Emulsifiers such as Mono- and di-glycerides of fatty acids INS471, Sodium stearoyl lactylate (SSL) E481, Diacetyltartaric and fatty acid esters of glycerol INS472e. The buffer- and stabilizing salts such as Monosodium phosphate E339(i), Monopotassium phosphate E340 (i), Disodium phosphate E339 (ii), Dipotassium phosphate E340(ii), Di Potassium Phosphate INS340, Trisodium phosphate E339 (iii), Tripotassium phosphate E340 (iii), Sodium carbonate E500(i), Trisodium Citrate E331(iii), Sodium Hexameta Phosphate E452(i), Sodium Tri Poly Phosphate E451, Tetra Sodium Pyrophosphate INS450 (iii), Sodium Hexametaphosphate INS452i, Trisodium Citrate INS331iii, sodium or potassium ortho phosphates such as monophosphates, diphosphates or triphosphates, sodium or potassium polyphosphates, sodium or potassium mono- or bicarbonates, sodium or potassium citrates, hexametaphosphate or a combination thereof.

The present invention also relates to a coffee creamer mix comprising a creamer as defined above and further comprises a coated or compacted coffee component wherein coffee component dissolves after the creamer dissolution.

The present invention also relates to use of the composition for preparation of tea or coffee beverage.

The present invention also relates to a process for preparation of spray-dried creamer wherein the process comprises (i) mixing the sugar, milk and fat; (ii) pasturing the mixture; (iii) homogenizing the mixture; (iv) evaporating the water to obtain concentrate of total solids at range of 50-60% by weight; and (v) spray drying the concentrate.

An advantage of the present disclosure is to provide a natural creamer having a high whitening capacity without using artificial ingredients.

Another advantage of the present disclosure is to provide a spray-dried powder creamer that does not include synthetic emulsifiers, buffer salts, stabilizing salts and artificial whitening agents.

Still another advantage of the present disclosure to provide a long-term, stable creamer having excellent whitening effect that is stable for at least 4 months at a temperature of about 20° C. to about 30° C.

Another advantage of the present disclosure is to provide a spray-dried powder creamer that has a good mouthfeel, body, smooth texture, and a good flavor without off-notes.

Additional features and advantages are described herein, and will be apparent from, the following Detailed Description and the figures.

DETAILED DESCRIPTION

Figure 1:
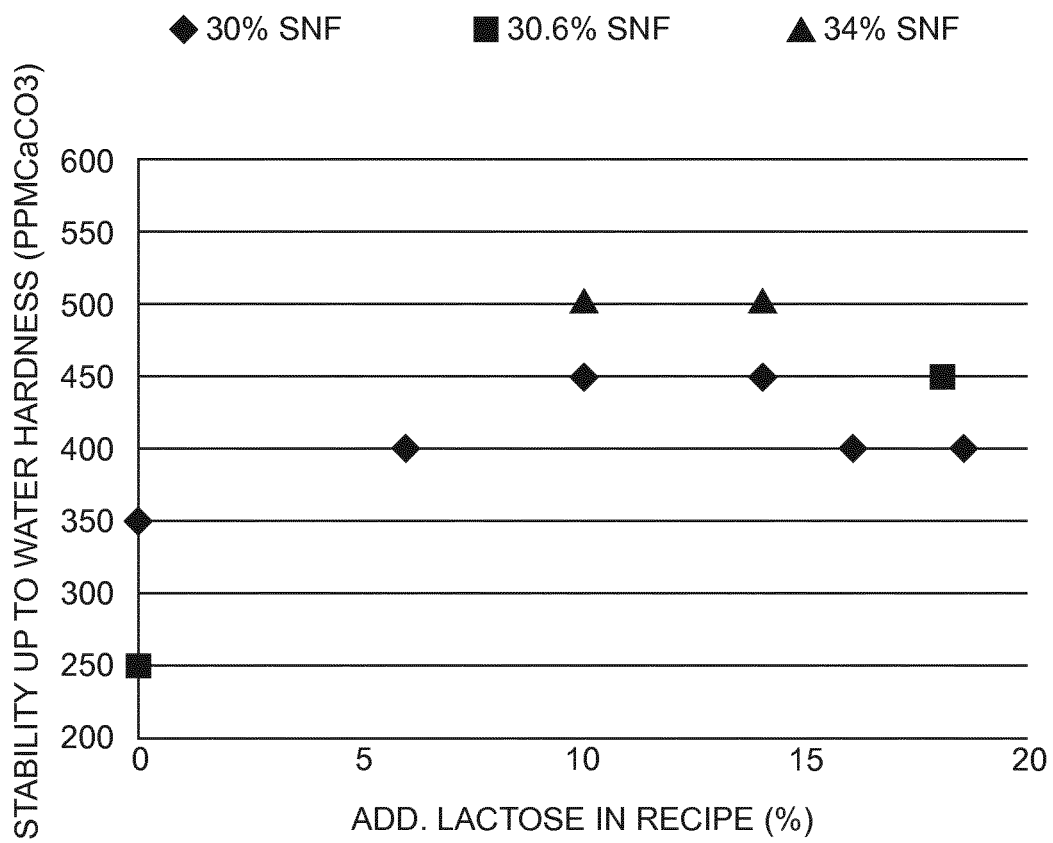
FIG. 1 shows stability of creamer against $CaCO_3$ induced precipitation vs. added lactose in recipe.
Figure 2:
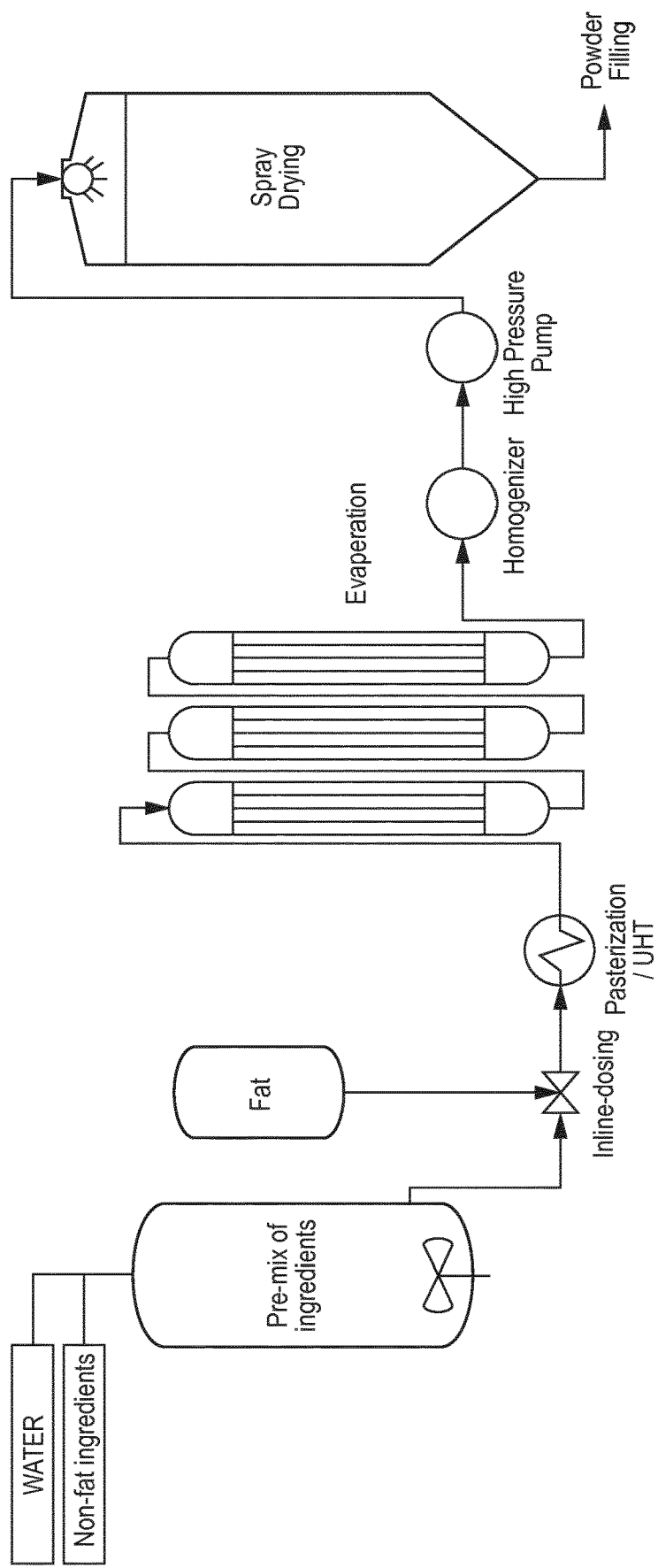
FIG. 2 shows process conditions to manufacture spray-dried creamer composition of the present invention.

The present disclosure relates to creamers and methods of making the creamers. The creamers of the present invention relates to spray-dried powder that may be added to any suitable beverage in an amount sufficient to provide whitening or creaming effect on the beverage. A creaming effect imparts qualities associated with cream or dairy such as desirable, flavor, texture, body, and/or color (e.g., lightening or whitening). In alternative embodiments, the creamers are natural, dairy-based, stable creamers that can include a combination of milk (skim or whole), heavy cream, sugar and a natural flavor. The fat, protein and sugar in the creamer can all come from natural sources. The creamer possesses an adequate shelf life or refrigerated stability and has excellent heat stability not causing unfavorable phenomena such as feathering, oil off, aggregation or cream separation, for example, after addition to a hot beverage such as coffee or tea.

As used herein, the term "stable" means remaining in a state or condition having minimal phase separation (e.g., creaming, sedimentation, age gelation) or spoilage or bitterness (e.g., due to storage) for an extended period of time (e.g., for at least 3, 4, 5, 6 or more months) depending on the storage conditions.

In a general embodiment, the present disclosure provides a spray-dried creamer composition comprising added sugar comprising sucrose and/or lactose ranging from 5-30% by weight; milk ranging from 30-60% by weight; fat ranging from 15-40% by weight; wherein said composition is devoid of added emulsifiers and/or buffer- and stabilizing salts wherein said composition does not flocculate upon reconstitution in coffee or tea at temperature of water ranging from 40-90° C. and hardness up to 400 ppm $CaCO_3$. The emulsifiers mean Mono- and di-glycerides of fatty acids INS471, Sodium stearoyl lactylate (SSL) E481, Diacetyltartaric and fatty acid esters of glycerol INS472e. The buffer- and stabilizing salts means Monosodium phosphate E339(i), Monopotassium phosphate E340 (i), Disodium phosphate E339 (ii), Dipotassium phosphate E340(ii), Di Potassium Phosphate INS340, Trisodium phosphate E339 (iii), Tripotassium phosphate E340 (iii), Sodium carbonate E500(i), Trisodium Citrate E331(iii), Sodium Hexameta Phosphate E452(i), Sodium Tri Poly Phosphate E451, Tetra Sodium Pyrophosphate N5450 (iii), Sodium Hexametaphosphate INS452i, Trisodium Citrate INS331iii, sodium or potassium ortho phosphates such as monophosphates, diphosphates or triphosphates, sodium or potassium polyphosphates, sodium or potassium mono- or bicarbonates, sodium or potassium citrates, hexametaphosphate or a combination thereof.

In one embodiment of the present invention the milk comprises fresh skimmed milk, skimmed milk powder, fresh whole milk and whole milk powder.

In one embodiment of the present invention the fat comprises anhydrous milk fat, cream, cream powder and/or vegetable fat (coconut oil, palm oil). Oil of vegetable origin such as palm kernel oil, hydrogenated palm kernel oil, hydrogenated palm kernel olein, hydrogenated coconut oil, coconut oil, canola oil, soy bean oil, sunflower oil, safflower oil, cotton seed oil, palm oil, corn oil, and/or coconut oil and/or fat of animal origin such as milk fat. Milk fat may e.g. be provided in the form of milk, milk powder, butter milk, butter milk powder, cream, cream powder, butter, butterfat, anhydrous milk fat and combinations thereof.

In one embodiment of the present invention the sugar is lactose ranging from 10-20% by weight.

In one embodiment of the present invention the composition further comprises glucose syrup ranging from 25-35% by weight.

As an example of the method according to an embodiment of the present disclosure, a dairy creamer can be prepared by mixing cream, milk (e.g., skim or whole) and sugar. This dairy mixture can be exposed to a temperature ranges from about 45° C. to about 85° C. for a suitable time (e.g., about 20, 25, 30, 35, 40, 45, 50, 55, 60 or more minutes) to cause protein denaturation. The dairy mixture can then be sterilized by steam injection or infusion, for example, at minimum of about 141° C. for about 5 seconds or any other suitable duration.

In any embodiments of the methods described herein, during processing and production of the creamer, the mixing of any components of the creamers such as proteins/dairy product, fat/dairy product, sugar(s), flavor(s), etc., in water can be done under agitation, with or followed by heat treatment, homogenization, spray drying and filling. Direct heat treatment can be performed by injecting steam water in the emulsion. In this case, it may be necessary to remove excess water, by flashing. Indirect heat treatment can be performed with a heat transfer interface in contact with the emulsion. The homogenization could be performed before and/or after heat treatment. It may be interesting to perform homogenization before heat treatment in order to improve heat transfers in the emulsion, and thus achieve an improved heat treatment. Performing a homogenization after heat treatment usually ensures that the oil droplets in the emulsion have the desired dimension.

In one embodiment, the coffee component comprises coffee particles coated by a coating agent which reduces the water solubility of the soluble coffee particles. The coating agent is preferably a carbohydrate (for example sucrose, fructose, maltose, dextrose, maltodextrin, lactose, coffee solids, pectin, xanthan gum and starch), a protein (for example milk solids, or gelatin) or an edible fat (for example lecithin or edible vegetable fats such as coconut fat). Carbohydrate and mixtures thereof are particularly preferred as coating agents. In a particularly preferred embodiment, the particles are coated by a panning process, adding the carbohydrate as syrup and/or fine powder and successively drying the product. Preferably, the beverage or foodstuffs powder or ingredient dissolve in water at about 85° C. after about 2 seconds or more (time measured after immersion for 50% dissolution with a mechanical agitation at 100 rpm). In particular, it is preferred if 50% of the beverage or foodstuffs powder or ingredient dissolve in about 3 seconds to about 10 seconds.

In another embodiment the coffee component comprises compacted coffee wherein the solubility of the coffee component is retarded by compacting the powder to increase its density. EP 0229920 provides many examples of producing compacted coffee. Two elements are required for producing compacted coffee, (i) moisture, preferably in range of about 3 to about 6% by weight, and compaction under pressure of from about 20.7 MPa to about 48.3 MPa to form a coherent tablet. Soluble coffee is also prepared (roasting, extraction, spray-drying) followed by compacting the soluble coffee through a roller compactor (pressure is applied to the coffee).

EXAMPLES

By way of example and not limitation, the following examples are illustrative of various embodiments of the present disclosure.

All samples were analyzed in a defined test recipe as outlined in below examples (Test recipe for creamer in mixes; dry-mix of ingredients before reconstitution in water).

| Ingredient | Example 1.: Dairy creamer with whole milk + creamer (composition powder dry matter) |
| --- | --- |
| Solids from liquid whole milk | 70.4 |
| Solids from liquid cream | 7.4 |
| Sugar | 20.2 |
| Moisture | 2.0 |
| Total | 100.0 |

Solids from liquid whole milk were pre-mixed with sugar and moisture, pH is adjusted where required followed by the inline dosing of fat in form of solids from liquid cream. This process is followed by pasteurization/UHT treatment (total solids of mix ca. 17-20%) at minimum of 102° C. for 5 seconds. The next step is evaporation (total solids of concentrate ca. 53-55%), followed by homogenization of the concentrate with 180-240 bar and spray-drying of the mix at moderate spray pressure & drying temperature and filling of the powder.

| Ingredient | Example 2.: Dairy creamer with skimmed milk powder + milk fat (composition powder dry matter) |
| --- | --- |
| Skimmed milk powder | 50.0 |
| Anhydrous Milk Fat | 28.0 |
| Sugar | 20.0 |
| Moisture | 2.0 |
| Total | 100.0 |

| Ingredient | Example 3a.: Filled dairy creamer with skimmed milk + coconut oil (composition powder dry matter) | Example 3b.: Filled dairy creamer with skimmed milk + coconut oil (composition powder dry matter) |
| --- | --- | --- |
| Solids from fresh skimmed milk | 30.0 | 34.0 |
| Coconut Oil | 25.0 | 25.0 |
| Lactose | 10.2 | 14.0 |
| Glucose Syrup | 32.8 | 25.0 |
| Moisture | 2.0 | 2.0 |
| Total | 100.0 | 100.0 |

The creamer compositions described in examples 3a and 3b were obtained through a similar process as described above except the inline dosing of fat comprises of coconut oil. Further experiments were conducted wherein additional amount of lactose was added as shown in table below.

| Creamer Sample N° N° | Added lactose Solids [%] | MSNF Solids [%] |
| --- | --- | --- |
| Example 3a | 18.5 | 30.0 |
| Example 3b | 18.5 | 30.0 |
| Example 3a | 18.5 | 37.6 |
| Example 3b | 18.5 | 37.6 |
| Example 3a | 0.0 | 30.0 |
| Example 3b | 0.0 | 30.0 |

As indicated in FIG. 1, the stability of creamers with additional lactose added in the recipe is increased versus the variants without additional lactose (variants processed with similar conditions). In addition, it seems that there is a certain optimal level of added lactose leading to better stability of the creamer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A spray-dried creamer composition comprising:
added sugar comprising lactose ranging from 5-30% by weight of the spray-dried creamer composition;
glucose syrup ranging from 25-35% by weight of the spray-dried creamer composition;
milk ranging from 30-60% by weight of the spray-dried creamer composition; and
fat ranging from 15-40% by weight of the spray-dried creamer composition and selected from the group consisting of anhydrous milk fat, vegetable fat, and combinations thereof;
wherein the spray-dried creamer composition is devoid of an added agent selected from the group consisting of mono- and di-glycerides of fatty acids, sodium stearoyl lactylate, diacetyltartaric and fatty acid esters of glycerol, monosodium phosphate, monopotassium phosphate, disodium phosphate, dipotassium phosphate, trisodium phosphate, tripotassium phosphate, sodium carbonate, trisodium citrate, sodium hexametaphosphate, sodium tripolyphosphate, tetrasodium pyrophosphate, sodium or potassium ortho phosphates, sodium or potassium polyphosphates, sodium or potassium mono- or bicarbonates, sodium or potassium citrates, hexametaphosphate, and combinations thereof; and the spray-dried creamer composition does not flocculate upon reconstitution in coffee or tea at a water temperature ranging from 40-90° C. and water hardness from 250 to 400 ppm $CaCO_3$.

2. The spray-dried creamer composition of claim 1, wherein the milk is selected from the group consisting of fresh skimmed milk, skimmed milk powder, fresh whole milk, whole milk powder, and combinations thereof.

3. The spray-dried creamer composition of claim 1, wherein the lactose is 10-20% by weight of the spray-dried creamer composition.

4. A method for preparation of a tea or coffee beverage, the method comprising adding to a tea or coffee a spray-dried creamer composition comprising:

added sugar comprising lactose ranging from 5-30% by weight of the spray-dried creamer composition; glucose syrup ranging from 25-35% by weight of the spray-dried creamer composition; milk ranging from 30-60% by weight of the spray-dried creamer composition; and fat ranging from 15-40% by weight of the spray-dried creamer composition and selected from the group consisting of anhydrous milk fat, vegetable fat, and combinations thereof;

wherein the spray-dried creamer composition is devoid of added agent selected from the group consisting of mono- and di-glycerides of fatty acids, sodium stearoyl lactylate, diacetyltartaric and fatty acid esters of glycerol, monosodium phosphate, monopotassium phosphate, disodium phosphate, dipotassium phosphate, trisodium phosphate, tripotassium phosphate, sodium carbonate, trisodium citrate, sodium hexametaphosphate, sodium tripolyphosphate, tetrasodium pyrophosphate, sodium or potassium ortho phosphates, sodium or potassium polyphosphates, sodium or potassium mono- or bicarbonates, sodium or potassium citrates, hexametaphosphate, and combinations thereof; and the spray-dried creamer composition does not flocculate upon reconstitution in the tea or coffee at a water temperature ranging from 40-90° C. and water hardness from 250 to 400 ppm $CaCO_3$.

5. A coffee creamer mix comprising:

a spray-dried creamer composition comprising added sugar comprising lactose ranging from 5-30% by weight of the spray-dried creamer composition; glucose syrup ranging from 25-35% by weight of the spray-dried creamer composition; milk ranging from 30-60% by weight of the spray-dried creamer composition; fat ranging from 15-40% by weight of the spray-dried creamer composition and selected from the group consisting of anhydrous milk fat, vegetable fat, and combinations thereof; wherein the spray-dried creamer composition is devoid of an added agent selected from the group consisting of mono- and di-glycerides of fatty acids, sodium stearoyl lactylate, diacetyltartaric and fatty acid esters of glycerol, monosodium phosphate, monopotassium phosphate, disodium phosphate, dipotassium phosphate, trisodium phosphate, tripotassium phosphate, sodium carbonate, trisodium citrate, sodium hexametaphosphate, sodium tripolyphosphate, tetrasodium pyrophosphate, sodium or potassium ortho phosphates, sodium or potassium polyphosphates, sodium or potassium mono- or bicarbonates, sodium or potassium citrates, hexametaphosphate, and combinations thereof; and the spray-dried creamer composition does not flocculate upon reconstitution in coffee or tea at a water temperature ranging from 40-90° C. and water hardness from 250 to 400 ppm $CaCO_3$; and coated or compacted coffee that dissolves after the spray-dried creamer composition dissolution.

6. A process for preparation of a spray-dried composition, the process comprising:

preparing a mixture comprising added sugar comprising lactose ranging from 5-30% by weight of the spray-dried composition, glucose syrup ranging from 25-35% by weight of the spray-dried composition, milk ranging from 30-60% by weight of the spray-dried composition, and fat ranging from 15-40% by weight of the spray-dried composition and selected from the group consisting of anhydrous milk fat, vegetable fat, and combinations thereof, wherein the mixture is devoid of an added agent selected from the group consisting of mono- and di- glycerides of fatty acids, sodium stearoyl lactylate, diacetyltartaric and fatty acid esters of glycerol, monosodium phosphate, monopotassium phosphate, disodium phosphate, dipotassium phosphate, trisodium phosphate, tripotassium phosphate, sodium carbonate, trisodium citrate, sodium hexametaphosphate, sodium tripolyphosphate, tetrasodium pyrophosphate, sodium or potassium ortho phosphates, sodium or potassium polyphosphates, sodium or potassium mono- or bicarbonates, sodium or potassium citrates, hexametaphosphate, and combinations thereof; and pasteurizing the mixture;

homogenizing the mixture;

evaporating water from the mixture to obtain a concentrate of total solids in a range of 50-60% by weight; and spray drying the concentrate to form the spray-dried composition, the spray-dried composition does not flocculate upon reconstitution in the tea or coffee at a water temperature ranging from 40-90° C. and water hardness from 250 to 400 ppm $CaCO_3$.

7. The spray-dried creamer composition of claim 1, wherein the fat is an oil selected from the group consisting of coconut oil, palm oil and a mixture thereof.

\* \* \* \* \*